US006491066B1

(12) United States Patent
Pitman et al.

(10) Patent No.: US 6,491,066 B1
(45) Date of Patent: Dec. 10, 2002

(54) RESILIENT BEVEL FOR PROFILE WALL PIPE

(75) Inventors: John I. Pitman, Lubbock, TX (US); Ronald R. Bishop, Grand Island, NE (US); Dennis E. Bauer, Grand Island, NE (US); Gerald E. Parkinson, Grand Island, NE (US)

(73) Assignee: Diamond Plastics Corporation, Grand Island, NE (US)

( * ) Notice: Subject to any disclaimer, the term of this patent is extended or adjusted under 35 U.S.C. 154(b) by 0 days.

(21) Appl. No.: 09/572,400

(22) Filed: May 16, 2000

Related U.S. Application Data

(60) Provisional application No. 60/164,268, filed on Nov. 9, 1999.

(51) Int. Cl.$^7$ .................................................. F16L 9/18
(52) U.S. Cl. ...................... 138/109; 138/115; 138/148; 156/211; 156/278; 264/138; 264/152; 285/237; 285/332
(58) Field of Search .................................. 138/109, 115, 138/148; 285/237, 332; 156/197, 211, 278, 304.5, 322; 264/138, 152

(56) References Cited

U.S. PATENT DOCUMENTS

| 3,757,827 | A | * | 9/1973 | Seiwert et al. | 138/109 |
| 4,341,392 | A | * | 7/1982 | Van Dongeren | 138/115 |
| 4,824,502 | A | * | 4/1989 | Nagayoshi et al. | 138/122 |
| 5,096,528 | A | * | 3/1992 | Durrenberger et al. | 138/109 |
| 5,099,888 | A | * | 3/1992 | Valls, Jr. | 138/109 |
| 5,362,114 | A | * | 11/1994 | Levingston | 138/109 |

* cited by examiner

*Primary Examiner*—James Hook
(74) *Attorney, Agent, or Firm*—Oblon, Spivak, McClelland, Maier & Neustadt, P.C.

(57) ABSTRACT

A method for forming a spigot on a double-walled pipe and spigots formed by this method are described. The outer wall and an intermediate space of a double-walled pipe is removed from one end of the pipe over the desired chamfer length, and a preformed annular resilient bevel is placed around the remaining inner wall. This method is convenient, requires limited materials and tools, provides easy access to a porous intermediate space for sealing, and does not introduce residual stress to the spigot. Furthermore, the properties of the spigot depend primarily upon the properties of the annular resilient bevel, increasing the probability of achieving a high quality and robust seal.

23 Claims, 3 Drawing Sheets

RESILIENT BEVEL FOR PROFILE WALL PIPE

The present application claims priority from provisional application No. 60/164,268 filed on Nov. 9, 1999.

BACKGROUND OF THE INVENTION

1. Field of the Invention

The present invention relates to a method for forming a spigot end on double-walled pipe, as well the spigot ends formed by this method.

2. Discussion of the Background

Double-walled pipes are well-known. For an example of a production method of commercial significance, please see Petzetakis et al. (U.S. Pat. No. 3,917,500) which is hereby incorporated by reference. Despite the mechanical advantages of double-walled pipes, problems with handling exist. One handling problem arises during joining neighboring sections of pipe to produce a continuous longer pipe. Joining is commonly performed with a "bell and spigot" joint. One end of one of the sections of pipe that will be joined (the spigot) is endowed with a smaller outer diameter than the inner diameter of one end of the other section of pipe (the bell). This can be done during manufacture of the neighboring sections of pipe, or it can be done after cutting and other preparation unique to the location where the sections of pipes will be used. Regardless of when and how the bell and spigot are formed, joining involves the insertion of the smaller outer diameter portion of pipe (spigot) into the larger inner diameter of pipe (bell). Sealing a bell and spigot joint to prevent leakage can be done in many ways, and is highly dependent upon materials and conditions.

Sealing a double-walled pipe has proven to be relatively difficult. Because of the existence of one or more continuous channels between the inner and outer wall of a double-walled pipe in many commercially important double-walled pipes, both the inner and the outer wall of both portions must be sealed at each joint. Otherwise, the channel(s) may serve as a path for mass transport of material between the interior and the exterior of a pipe. This mass transport, otherwise known as leaking, can result in waste, damage to other infrastructure, excessive pressure drops along the length of the pipes, or health and safety concerns depending upon the material carried in the pipes.

Various methods for sealing double-walled pipes have been proposed, and the ones discussed herein are hereby incorporated by reference. Valls (U.S. Pat. No. 5,099,888) teaches the sealing of double-walled pipes by "inserting an annular elastomeric plug into a slot formed at the pipe ends, whereby the plug projects axially beyond the pipe end to provide impact resistance." (col. 2, lines 12–15) This annular plug "is particularly designed and configured for securement within a groove or circumferential slot formed by removal of at least one of the ribs adjacent to the end of the pipe where the annular ring is being provided" (col. 2, lines 49–53).

Durrenberger et al. (U.S. Pat. No. 5,096,528) teaches the sealing of double-walled pipes when "a substantial portion of the intermediate wall which lie[s] between the side walls axially inward of the outer end of the pipe is removed for a distance substantially equal to the desired length of the chamfer and circumferentially of the pipe to define a circumferentially continuous, axially outward open channel between the side walls. After the intermediate wall portions are removed, the outer end of at least one of the side walls is deflected to a position wherein it substantially engages the other side wall and closes the outwardly open channel" (col.1, line 61–col.2, line 3).

It should be noted that both of the above-mentioned references require the formation of a "circumferential slot" through the removal of the helical rib(s) (otherwise called an "intermediate wall") located between the inner wall and the outer wall at the end of the double-walled pipe. Furthermore, both references teach the sealing of this circumferential slot rather than the sealing of the helical channel(s) defined by the helical rib(s). In both references, sealing this circumferential slot is performed by deflecting the outer wall toward the primary axis of the double-walled pipe. Since the initial diameter of the outer wall prior to deflection is larger than the final diameter of the outer wall after deflection, the outer wall must be compressed in order to achieve this deflection. In both references, this compression is ameliorated by heating the end of the double-walled pipe.

In the Durrenberger et al. (U.S. Pat. No. 5,096,528) reference, an additional adhesive layer is required on the outer face of the inner wall at the end of the double-walled pipe to affix the inner wall to the outer wall. Furthermore, the chamfer formed by the deflection of the outer wall is constrained to have the material properties of the outer wall of the double-walled pipe. In other words, since the spigot is comprised of the same material as the outer wall, the sealing and flexibility of the spigot cannot be optimized for a joint. Rather, the material properties of the joint are the same as the materials properties of the entire double-walled pipe.

In the Valls (U.S. Pat. No. 5,099,888) reference, an annular ring is inserted into the circumferential slot to both form a seal and provide some degree of control over the material properties of the joint. However, Valls teaches compression sealing of the annular ring between the inner and outer wall of the double-walled pipe, despite the fact that any residual stress in the outer wall due to deflection toward the primary axis will oppose this seal.

SUMMARY OF THE INVENTION

Accordingly, one object of this invention is to provide a novel method for forming a spigot end on a double-walled pipe that is applicable to a variety of types of double-walled pipes.

A further object of this invention is to provide a method for forming a spigot end on a double-walled pipe that does not require the formation of a circumferential slot at the end of the pipe.

A further object of this invention is to provide a method for forming a spigot end on a double-walled pipe with a porous intermediate layer, wherein the channel or channels between the inner and outer walls are not pressure sealed.

A further object of this invention is to provide a method for forming a spigot end on a double-walled pipe that itself is formed by the contiguous winds of a helix of a smaller diameter pipe or pipes, wherein the channel of the smaller diameter pipe or pipes is sealed rather than the area between the inner wall to the outer wall.

A further object of this invention is to provide a method for forming a spigot end on a double-walled pipe having a porous intermediate layer, wherein the porous intermediate layer is accessible during the spigot-forming process.

A further object of this invention is to provide a method for forming a spigot end on a double-walled pipe wherein deflection of the outer wall is not required.

A further object of this invention is to minimize the number of tools and steps, as well as the degree of difficulty, used in forming a spigot end on a double-walled pipe.

A further object of this invention is to provide a spigot end on a double-walled pipe that is formed by a method incorporating the advantages described above.

A further object of this invention is to provide a spigot end on a double-walled pipe that seals a porous intermediate layer with a minimum of sealant and that seals as small an area as possible.

A further object of this invention is to provide a spigot end on a double-walled pipe wherein the properties of the chamfer are both optimized and easily varied for a range of applications.

To these ends, the present invention provides a method whereby a spigot end is formed upon a double-walled pipe by first removing substantially all of the outer wall and the intermediate layer from one end of the double-walled pipe over a length substantially equal to the chamfer length to form an annular ledge consisting substantially of the inner wall. An annular resilient bevel is then fixed around this annular ledge to form a spigot that has the material properties of this bevel, rather than the properties of the outer wall of the double-walled pipe. Furthermore, since the outer wall of the double-walled pipe is not radially compressed to form all or a portion of the chamfer, it need not be heated to ameliorate any compressive stress arising from this process. This limits the number of steps and types of tools needed to form a spigot join, and eliminates residual stress that may prove problematic during sealing.

Sealing a channel or channels that exist between the inner and outer wall of a double-walled pipe is both simplified and improved by the present invention. Since substantially all of the outer wall and the intermediate layer are removed, any channel or channels intermediate to the inner and outer wall are easily accessible at a position substantially equal to a chamfer length distant from the spigot end. Thus, the channel(s) can be plugged, rather than sealing an entire circumferential slot. Plugging the channel(s) directly will result in a higher quality seal using a smaller amount of material.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

The remaining figures are views showing the sequence and method steps used in practicing the preferred embodiment of the invention to produce a spigot on a spiral wound, double-walled pipe.

Figure 1A:
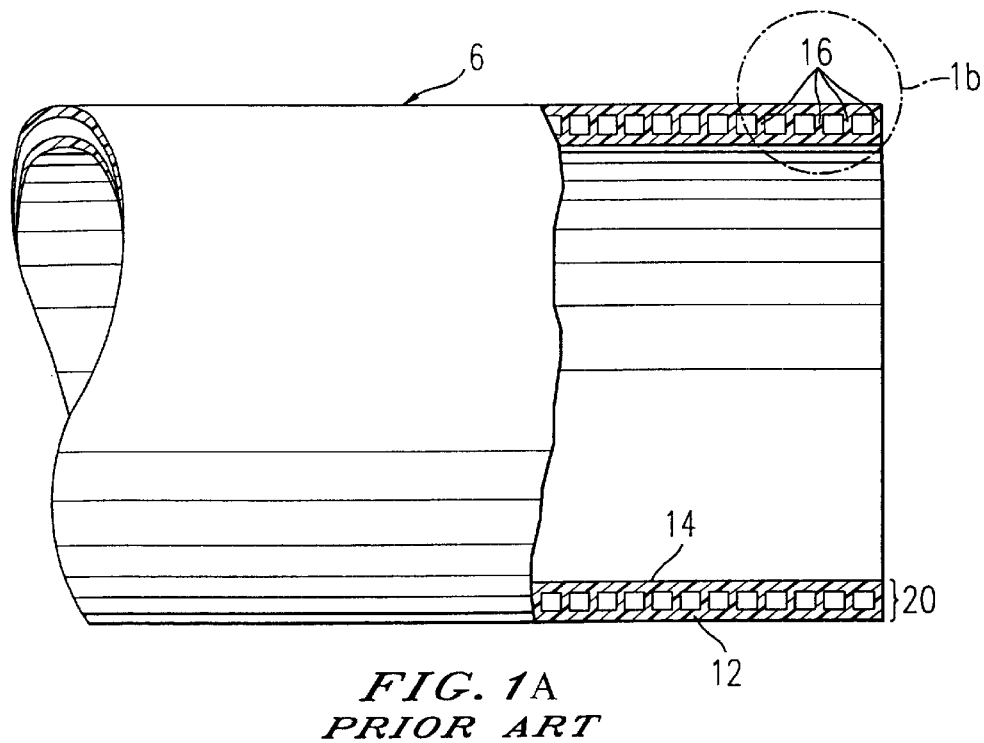
FIGS. 1a and 1b are side elevational views of a spiral wound, double-walled pipe to which the invention is applicable.
Figure 1B:
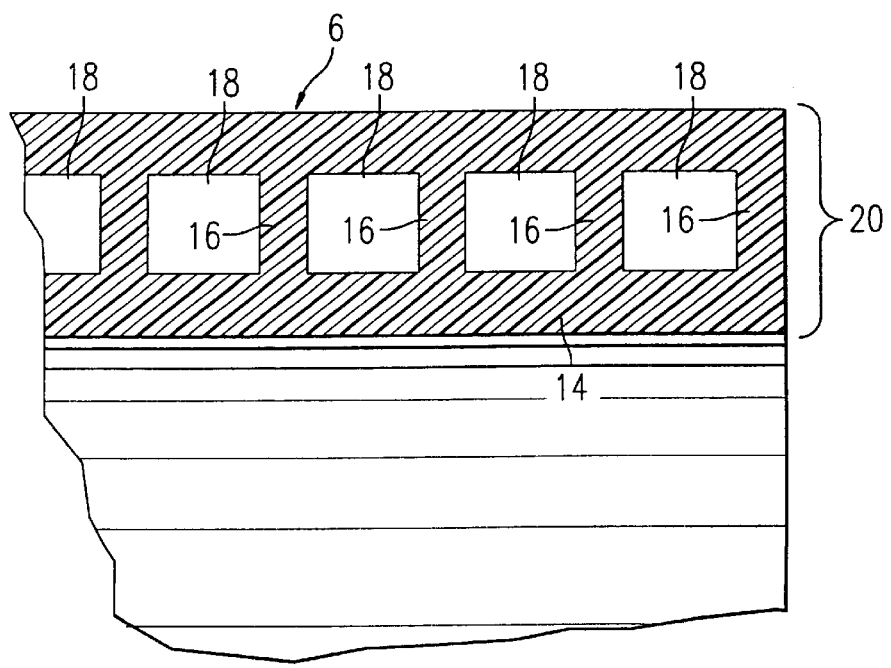
Figure 2:
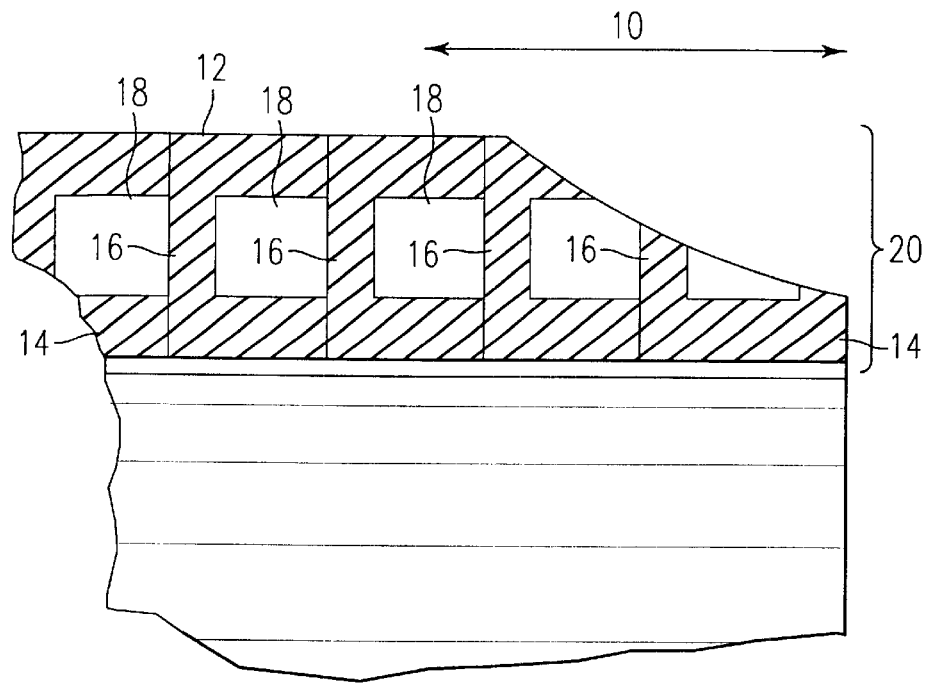

FIG. 2 is a side elevational view of an example of a spiral wound, double-walled pipe such as in FIG. 1b after being cut to a desired length and having a portion of the outer wall and inner rib fractured off during cutting.

Figure 3:
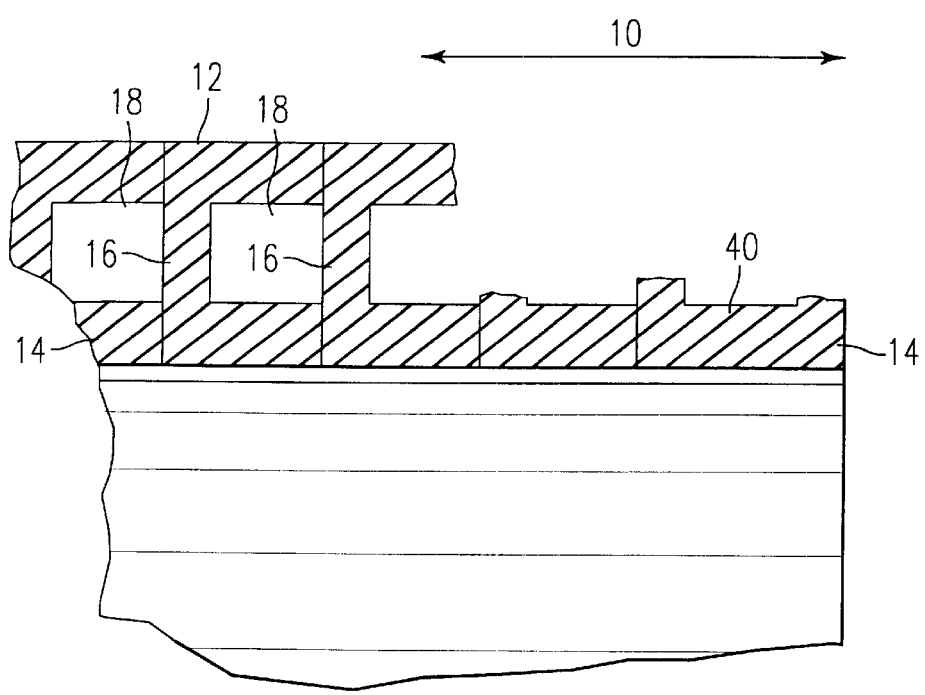

FIG. 3 is a side elevational view of a spiral wound, double-walled pipe such as in FIG. 1b or FIG. 2 after removal of substantially all of the outer wall and the helical rib in the chamfer length to form an annular ledge.

Figure 4:
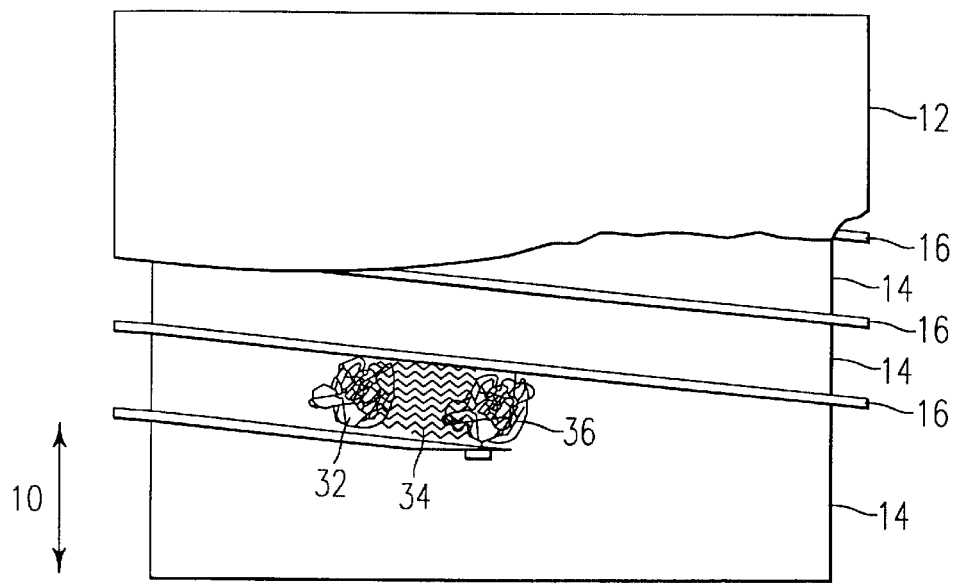

FIG. 4 is a cutaway view of the side of a spiral wound, double-walled pipe of FIG. 3 with a sealant placed directly within the helical channel.

Figure 5:
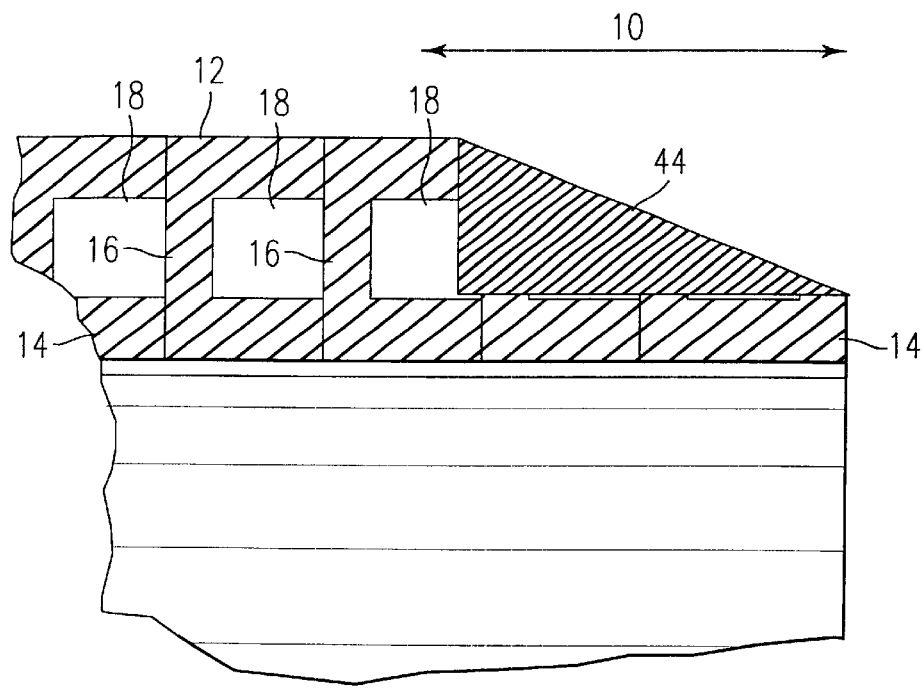

FIG. 5 is a side elevational view of a spiral wound, double-walled pipe such as in FIG. 3 or FIG. 4 after placement of a resilient bevel around the annular ledge to form a spigot.

DETAILED DESCRIPTION OF THE PREFERRED EMBODIMENTS

Referring now to the drawings, wherein like reference numerals designate identical or corresponding parts throughout the several views, and more particularly to FIG. 1, wherein an example of a cylindrical double-walled pipe 6 is illustrated. This pipe has a cylindrical inner wall 14 that is concentric with a cylindrical outer wall 12. Furthermore, the volume intervening the outer diameter of the cylindrical inner wall 14 and the inner diameter of the cylindrical outer wall 12 forms an intermediate space 20.

The intermediate space has one or more helical channels defined by one or more helical ribs. In the example provided here, a single helical channel 18 is defined by a single helical rib 16 that extends the entire length of the double-walled pipe 6. This helical channel 18 can undesirably facilitate mass transport between the interior and the exterior of the double-walled pipe 6 when pipes are joined in certain geometries such as a bell and spigot joint.

In order to avoid this problem, the present invention provides a spigot on the double walled-pipe, and this method and the sequence of steps that constitutes one example of this method are shown in FIGS. 2–5. These drawings are directed to single helical channel, double-walled pipes of commercial significance described, for example, in U.S. Pat. No. 3,917,500. This method and its equivalents can be applied to other double-walled pipes not specifically described herein.

The double-walled pipe 6 is first cut to the desired length to form an end that will be made into a spigot of chamfer length 10, as shown in FIG. 2. Often, the cutting blade will also fracture off a portion of the outer wall and a portion of the inner ribs in a single step. Since this is an inherently uncontrolled process, FIG. 2 illustrates only one example of the type of structure that may be achieved. If cutting is not necessary, i.e., the pipe has the desired length without any cutting, the remainder of the present invention can still be practiced on a pipe as shown in FIG. 1. FIG. 2 is included to illustrate that an occurrence that was problematic when practicing the prior art, namely uncontrolled fracture of the outer wall during cutting, has been transformed by the present invention into an advantage.

After cutting, double-walled pipe 6 is further prepared for sealing by removing substantially all of any portion of the outer wall 12 and as well as substantially all of any of the helical rib 16 in the chamfer length 10 to yield a structure such as illustrated in FIG. 3. There is no continuous taper of the ribs over the chamfer length 10 and the outer wall 12 is not preserved over the chamfer length to form a circumferential slot in conjunction with the inner wall 14. Rather, only an annular ledge 40 consisting substantially of only the inner wall 14 remains within the chamfer length 10. This can be accomplished using, for example, a router. Since the chamfer length 10 along the annular ledge 40 is more accessible than a comparable chamfer length located with in a circumferential slot as in the prior art, machining can be performed with higher accuracy and accidental damage can be avoided.

After the annular ledge 40 has been prepared, the helical channel 18 defined by helical rib 16, the inner wall 14, and the outer wall 12 can be sealed. Since the outer wall 12 and helical rib 16 have been substantially removed from the entire chamfer length 10, helical channel 18 is easily accessible. Sealing can be accomplished by accurately placing a sealant at the end of the helical channel. Other methods of sealing are possible, but placing the sealant directly over or within helical channel 18 minimizes the open area that must be sealed, saves on material costs, and allows higher operating pressures. Sealing can be accomplished, for example, by plugging helical channel 18 with cotton 32 using a rod (not shown), filling helical channel 18 with a hot melt adhesive 34, and then adding more cotton 36 to the adhesive 34, as seen in FIG. 4.

Although not shown, the female or bell end of the other pipe may be heated, expanded on a belling mandrel, and a gasket applied to the belled end to insure improved tightness of the joint.

The final step in preparing a spigot by the current invention involves placing a preformed resilient bevel 44 on ledge 40 to form a continuous chamfer as seen in FIG. 5. The resilient bevel 44 can span the entire chamfer length 10 or only a portion thereof. The bevel 44 can be adhered to the ledge using an adhesive, such as rubber cement. Furthermore, the material that constitutes the resilient bevel 44 can be chosen such that it will provide a good seal with the adjoining bell pipe. For example, an ideal bevel should be deform under compression at room temperature without breaking. An example of one such a bevel is a synthetic rubber bevel with a shore hardness of 80–95 where the gasket has a lower hardness such as a shore hardness of 60–65. Once the adhesive has set, the bevel 44 may be applied against the gasket of the bell end of the adjoining pipe.

Obviously, numerous modifications and variations are of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for forming a spigot on an end of a double-walled pipe having an outer wall, an inner wall, and an intermediate layer, comprising the steps of:
   removing substantially all of said outer wall and substantially all of said intermediate space over a chamfer length from said end of said double-walled pipe to produce an annular ledge substantially consisting of said inner wall; and
   affixing an annular resilient bevel configured to have a bevel length substantially equal to said chamfer length around said annular ledge.

2. The method of claim 1, further comprising the step of:
   cutting said double-walled pipe to a length suitable for an application before said removing step.

3. The method of claim 2, wherein the step of cutting to a suitable length further comprises the step of fracturing off a portion of said outer wall and a portion of said intermediate space.

4. The method of claim 1, wherein said step of affixing said annular resilient bevel to said annular ledge comprises the step of fixing using an adhesive.

5. The method of claim 4, wherein said adhesive is rubber cement.

6. The method of claim 1, further comprising the step of:
   driving said annular resilient bevel along said annular ledge until an inner face of said annular resilient bevel is substantially located said chamfer length distant from said end.

7. The method of claim 1, wherein the intermediate space is configured to have at least one channel, further comprising the step of sealing said channel with a sealant.

8. The method of claim 7, wherein said sealing step comprises the step of placing a liquid sealant into said channel.

9. The method of claim 7, wherein said sealing step comprises the step of:
   plugging said channel with a solid plug.

10. The method of claim 9, wherein said solid plug is cotton and said sealant is a hot melt adhesive.

11. The method of claim 1, wherein said annular resilient bevel has a shore hardness of about 80–95.

12. The method of claim 1, wherein said annular resilient bevel has a cross-sectional area substantially triangular in shape.

13. The method of claim 1, wherein said annular resilient bevel has a substantially quarter round cross-sectional area.

14. A double-walled pipe, comprising:
   an inner wall;
   an outer cylindrical wall surrounding said inner wall to define an intermediate space therebetween; and
   a chamfered spigot at an end of said pipe, said chamfered spigot comprising:
      an annular ledge substantially consisting of said inner wall of said double walled pipe and extending from said end to a position of a chamfer length distance from said end, and
      an annular resilient bevel substantially encasing the outer face of said annular ledge and having a bevel length substantially equal to said chamfer length, wherein said bevel is made of an element separate from said ledge.

15. The double-walled pipe of claim 14, further comprising:
   an adhesive affixing said annular resilient bevel to said annular ledge at the outer face of said annular ledge.

16. The double-walled pipe of claim 14, further comprising:
   a rubber cement adhesive affixing said annular resilient bevel to said annular ledge at the outer face of said annular ledge.

17. The double-walled pipe of claim 14, further comprising:
   at least one channel that spans the length of said double-walled pipe between said inner wall and said outer wall, said at least one channel further comprising;
      at least one open area that provides access to said channel at said position substantially said chamfer length distant from said end; and
      a sealant configured to seal said at least one open area.

18. The double-walled pipe of claim 14, further comprising:
   a sealant configured to seal a helical channel in said intermediate space.

19. The double-walled pipe of claim 18, further comprising:
   a solid plug sealing said helical channel; and
   an adhesive inside said helical channel.

20. The double-walled pipe of claim 19, wherein said solid plug is cotton and said adhesive is a hot melt adhesive.

21. The double-walled pipe of claim 14, wherein said annular resilient bevel has a shore hardness of about 80–95.

22. The double-walled pipe of claim 14, wherein said annular resilient bevel has a cross-sectional area substantially triangular in shape.

23. The double-walled pipe of claim 14, wherein said annular resilient bevel has a substantially quarter round cross-sectional area.

* * * * *